United States Patent
Gray et al.

(10) Patent No.: US 9,188,257 B2
(45) Date of Patent: Nov. 17, 2015

(54) FLAME RESISTANT HOSE REINFORCED WITH FIBERGLASS CORD FABRIC

(75) Inventors: Yelena Gray, Parker, CO (US); Timothy C. Zedalis, Denver, CO (US)

(73) Assignee: GATES CORPORATION, Denver, CO (US)

( * ) Notice: Subject to any disclaimer, the term of this patent is extended or adjusted under 35 U.S.C. 154(b) by 641 days.

(21) Appl. No.: 13/463,544

(22) Filed: May 3, 2012

(65) Prior Publication Data
US 2013/0291989 A1 Nov. 7, 2013

(51) Int. Cl.
F16L 11/00 (2006.01)
F16L 11/08 (2006.01)
F16L 11/12 (2006.01)

(52) U.S. Cl.
CPC .............. *F16L 11/083* (2013.01); *F16L 11/125* (2013.01)

(58) Field of Classification Search
CPC .................................... F16L 9/14; F16L 11/00
USPC ................. 138/123–126, 129–130, 144, 149, 138/DIG. 2; 428/35.7, 35.9, 36.1–36.2, 428/36.9–36.92
See application file for complete search history.

(56) References Cited

U.S. PATENT DOCUMENTS

| | | | |
|---|---|---|---|
| 2,482,702 A | 9/1949 | Billmeyer et al. | |
| 3,223,565 A | 12/1965 | Fritz et al. | |
| 3,357,456 A | 12/1967 | Grawey et al. | |
| 3,506,040 A | 4/1970 | Everling et al. | |
| 3,871,408 A | 3/1975 | Wood et al. | |
| 4,111,237 A * | 9/1978 | Mutzner et al. | 138/125 |
| 4,175,992 A | 11/1979 | Grawey | |
| 4,258,755 A * | 3/1981 | Higbee | 138/122 |
| 4,262,704 A | 4/1981 | Grawey | |
| 4,351,364 A * | 9/1982 | Cocks | 138/133 |
| 4,553,568 A * | 11/1985 | Piccoli et al. | 138/125 |
| 4,668,319 A | 5/1987 | Piccoli | |

(Continued)

FOREIGN PATENT DOCUMENTS

| | | |
|---|---|---|
| CN | 1865743 A | 11/2006 |
| EP | 1288357 A1 | 3/2003 |

(Continued)

OTHER PUBLICATIONS

BSI, "Ships and marine technology—Fire resistance of hose assemblies—Test methods," (BS ISO 155540:1999 incorporating amendment No. 1, May 2000).

(Continued)

*Primary Examiner* — Paul R Durand
*Assistant Examiner* — Andrew P Bainbridge
(74) *Attorney, Agent, or Firm* — Paul N. Dunlap, Esq.; Jeffrey A. Thurnau, Esq.

(57) ABSTRACT

A flame resistant hose having a nitrile-containing rubber inner tube layer; two reinforcing plies one or more insulating plies of rubberized fiberglass unidirectional cord fabric helically wrapped at a helix angle in the range of 40-60 degrees with respect to the hose longitudinal axis and with the edges of each reinforcing ply overlapping up to about 0.5 inches; an optional rubber cushion or tie layer between the reinforcing plies and the insulating plies; and a polychloroprene rubber outer cover layer. The hose may have one or more helical wires embedded in the hose such as between the two reinforcing layers. The hose successfully passes fire resistance testing when tested according to BS ISO 15540:1999 incorporating amendment number 1.

20 Claims, 2 Drawing Sheets

(56) References Cited

U.S. PATENT DOCUMENTS

| | | | | |
|---|---|---|---|---|
| 5,343,895 A * | 9/1994 | King et al. | | 138/149 |
| 5,507,320 A * | 4/1996 | Plumley | | 138/126 |
| 6,158,476 A * | 12/2000 | Sjotun | | 138/126 |
| 6,230,751 B1 | 5/2001 | Sjotun | | |
| 6,286,558 B1 | 9/2001 | Quigley et al. | | |
| 7,238,400 B2 * | 7/2007 | Gerez et al. | | 428/36.9 |
| 2001/0013374 A1 * | 8/2001 | Niki et al. | | 138/138 |
| 2003/0181111 A1 | 9/2003 | De Meyer et al. | | |
| 2004/0144440 A1 | 7/2004 | Lundberg et al. | | |
| 2004/0221906 A1 | 11/2004 | Qutub et al. | | |
| 2005/0183785 A1 * | 8/2005 | Lundberg et al. | | 138/130 |
| 2005/0241716 A1 * | 11/2005 | Nagy et al. | | 138/123 |
| 2006/0151043 A1 | 7/2006 | Nanney et al. | | |
| 2008/0072984 A1 | 3/2008 | Branch et al. | | |

FOREIGN PATENT DOCUMENTS

| | | |
|---|---|---|
| EP | 2189697 A1 | 5/2010 |
| GB | 951483 | 3/1964 |
| GB | 986342 | 3/1965 |
| GB | 1007229 | 10/1965 |
| GB | 1525095 | 9/1978 |

OTHER PUBLICATIONS

NGF Canada Ltd, "NGF Canada Limited," sales brochure.

Parker Hannifin Corp, "Stratoflex Fire Resistance Testing of Aerospace Hose," Catalog 106-FR (Jun. 2001).

European Patent Office, International Preliminary Report on Patentability, and the Written Opinion of the International Searching Authority, date of issuance of the report Nov. 4, 2014.

State Intellectual Property of the People's Republic of China, Notification of the First Office Action application No. 2013800324061, notification date Aug. 5, 2015.

* cited by examiner

FLAME RESISTANT HOSE REINFORCED WITH FIBERGLASS CORD FABRIC

BACKGROUND OF THE INVENTION

1. Field of the Invention

This invention relates generally to reinforced hose, more particularly to a flame resistant hose construction, and specifically a rubber hose reinforced with fiberglass cord fabric.

2. Description of the Prior Art

Conventional hoses with rubber layers and spiraled or braided textile reinforcements of fibers such as polyester and nylon lose their performance in the presence of a heat source at temperatures above 150° C. or when exposed to open flames. One approach to increasing the heat or flame resistance of a hose is to include insulating layers between the reinforcement layers and the heat source. An example of this approach is taught in U.S. Pat. No. 3,223,565 to Fritz et al. Fritz et al. introduce two intermediate heat insulating layers of fiberglass cord fabric between the braided polyester reinforcing layer and the inner lining of silicone elastomer. The resulting hose is said to convey hot air heated to 615° F. (324° C.).

Another example of the same approach is taught in U.S. Pat. Pub. No. 2006/0151043A1 to Nanney et al. Nanney et al. teach adding an integral outer fire-sleeve layer of silicone, which could be reinforced with fiberglass, surrounding the metal reinforcement layers, along with a high-melting thermoplastic layer such as polyimide for thermal insulation between the metal reinforcement and the core tube. The hose is said to fail in the range of 400-500 seconds in fire testing according to SAE AS1055.

Conventional marine hoses used in a fuel system must be fire resistant to at least 2½ minutes, as specified in the marine fuel hose Standard BS EN ISO 7840. What is needed is a hose assembly with superior fire resisting qualities as specified in marine hose standard BS ISO 15540. What is needed is a hose assembly that can withstand fire testing at 800±50° C. flame temperatures for 30 minutes, followed by pressure proof testing at ambient temperature for two minutes.

SUMMARY

The present invention is directed to systems and methods which provide a hose assembly which can meet the fire resistance standard BS ISO 15540: 1999 with amendment number one, and can thus withstand fire testing at 800±50° C. flame temperatures for 30 minutes, followed by pressure proof testing at ambient temperature for two minutes. The present invention also provides flame resistant hoses with enhanced pressure ratings over similar hoses of conventional design.

The invention is directed to a flame resistant hose having a rubber inner tube layer two reinforcing plies of fiberglass unidirectional cord fabric helically wrapped at a helix angle in the range of 40-60 degrees with respect to the hose longitudinal axis and with the edges of each reinforcing ply overlapping up to about 0.5 inches; one or more insulating plies of fiberglass unidirectional cord fabric helically wrapped at a helix angle in the range of 40-60 degrees with respect to the hose longitudinal axis and with the edges of each ply overlapping up to about 0.5 inches; and a rubber outer cover layer. The hose may have a rubber cushion layer between the reinforcing plies and the insulating plies.

According to an embodiment of the invention the hose may have an outer cover layer of a polychloroprene rubber composition. The inner tube layer may be of a nitrile-containing rubber composition. The rubber cushion layer may be polychloroprene. One or more or all of the plies of fiberglass unidirectional cord fabric may be rubberized.

The inventive hose exhibits no leaks of 78-85° C. water pressurized at 5±0.2 bar during at least 30 minutes of exposure to fire with flames enclosing the test specimen at a flame temperature of 800±50° C. The exposed hose also exhibits no leaks when pressurized to a proof pressure of at least 10 bar for two minutes at ambient temperature subsequent to the 30 minutes of exposure to fire.

The inventive hose may include no additional textile reinforcing layers of organic polymeric fibers. The inventive hose may have no silicone rubber layer. The inventive hose may have no thermoplastic polymer layer, no fluoropolymer layer, and no braided or spiraled metal fiber layer.

The inventive hose may also have one or more helical wires for collapse resistance. The helical wire may be embedded in the hose between the two reinforcing layers. The hose may also have a corrugated outer surface.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
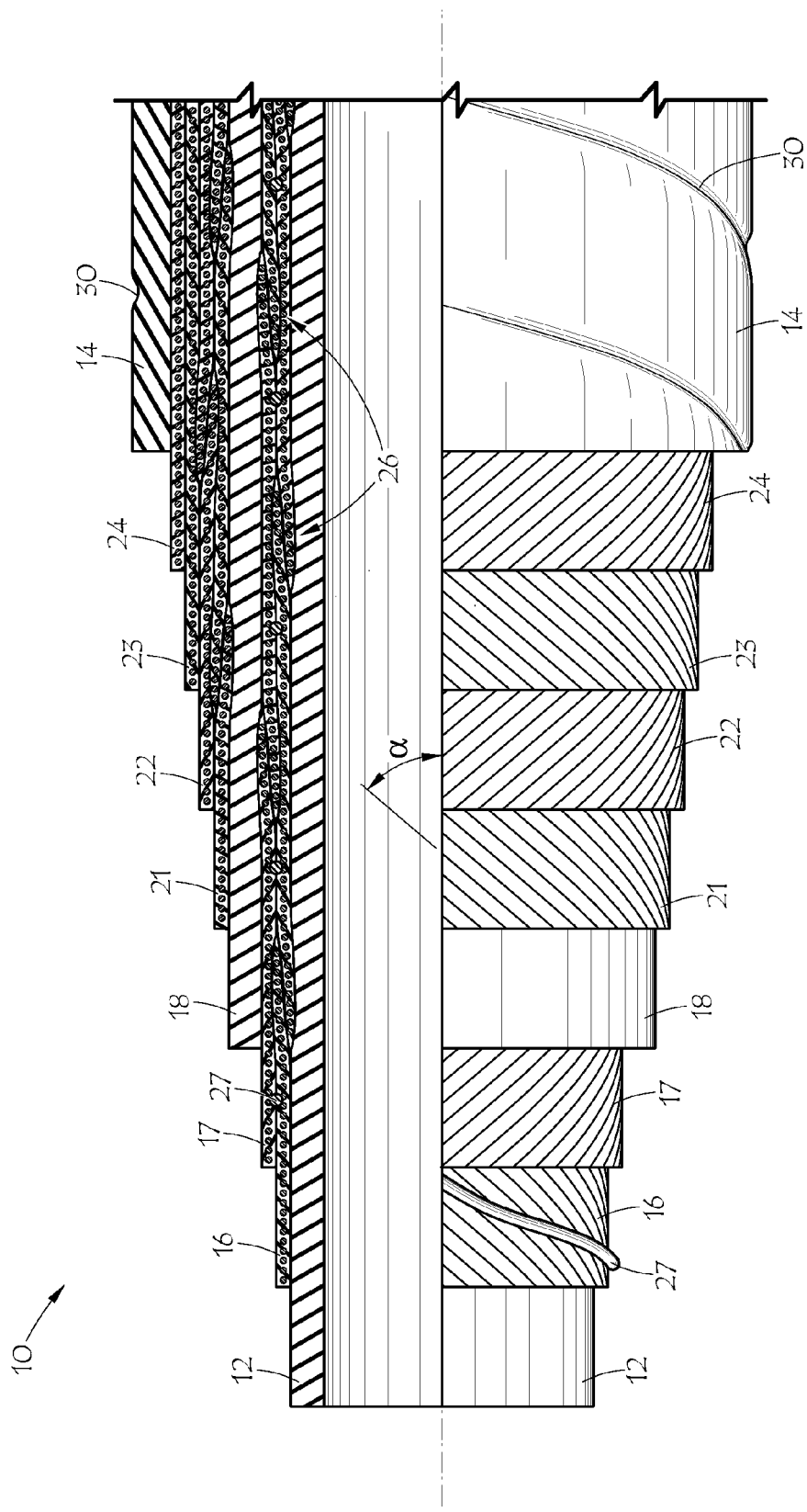
FIG. 1 is a partially fragmented, partially sectioned view of an embodiment of the invention.

FIG. 1 shows a typical hose according to an embodiment of the invention. Hose 10 includes inner tube 12, outer cover 14, two fiberglass reinforcing layers 16 and 17, cushion layer 18, and four fiberglass insulating layers 21, 22, 23, and 24. The embodiment of FIG. 1 also has optional helical coil 27 for improved collapse resistance and crush resistance. According to the invention, the fiberglass reinforcing layers and insulating layers are preferably spiral wrapped strips of fiberglass tire cord fabric. The spiral wrapped strips of fiberglass tire cord fabric are preferably overlapped somewhat as show at overlap 26 in FIG. 1. The amount of overlap is preferably much less than the width of the strips or minimal. Adjacent layers are preferably wrapped in opposite directions of wrap. The angle of wrap, α, may advantageously be in the range from 40° to 60°, or the angle may be the so-called neutral or lock angle of approximately 54° 44' relative to the cord longitudinal axis. Preferably the number of plies is an even number in order to balance the construction, but an odd number may be used, particularly if the angle of wrap of one of the layers is relatively close to ninety degrees, or greater than about 80°. Outer cover may have corrugations 28.

Cord, as used herein, is a twisted or formed structure composed of one or more single or plied filaments, strands, or yarns of inorganic materials, such as glass or ceramic. A filament is a continuous fiber of indefinite or extremely long length. A filament yarn is a yarn composed of continuous filaments assembled with or without twist. A yarn is a generic term for a continuous strand of textile fibers, filaments, or material, in a form suitable for knitting, weaving or otherwise intertwining to form a textile fabric. Tire cord fabric or unidirectional cord fabric, as used herein is a fabric in which multiple warp cords are held together in parallel, unidirectional fashion by weaving with small fill yarns. Typically, tire cord fabrics have from 15 to 35 warp cords per inch width of warp, and from 1 to 5 light filling yarns per inch of cord length (also known as picks).

The preferred cords are made of one or more yarns of continuous glass or ceramic filaments which are twisted, plied, and/or cabled together to form cords. The glass composition used in the glass cord may be E-glass, S-glass, basalt, or any other suitable glass composition. The glass filaments are generally coated with a sizing shortly after spinning or drawing.

The fill threads may be any suitable fiber, and they are primarily present for ease of handling of the tire cord fabric during rubberization or adhesive treating and in the hose factory. Polyester, rayon, cotton, olefin, acrylic or other fiber may be used for the fill threads.

The glass yarns, cords and/or tire cord fabric are preferably rubberized by treatment with a flexible adhesive such as an RFL (resorcinol-formaldehyde-latex) formulation, epoxy, isocyanate, urethane, rubber cement, and the like in order to enhance bonding of the fiber glass fabric to the body materials of the hose. The latex of the RFL may be, for example, vinylpyridine latex, styrenebutadiene latex, natural rubber latex, nitrile latex, or other common latexes or combinations thereof. The treatment also provides ease of handling of the fabric. In a preferred embodiment, the tire cord fabric is treated in a manner resulting in substantially complete penetration of the yarns or cords by the adhesive treatment. Penetration can generally be achieved by running the yarn through a dip tank having an adhesive treatment of sufficiently low viscosity and utilizing over one or more dies or rollers within and/or outside of the dip tank to work the treatment into the yarn. At the same time as the vulcanizing of the hose, the adhesive may be reacted by heat, causing the yarns or filaments to be strongly bonded to one another and/or to one or more rubber or plastic layers of the hose.

The tire cord fabric may be further rubberized with a layer of rubber applied to one or both sides and/or penetrated into the interstices between cords, for example by skimming or frictioning on a calender, or by other rubber coating or laminating method. The rubber layer on the tire cord fabric may then serve as a tie layer for improving bonding between a fabric ply and another layer of the hose. Additional tie layers may be used if needed. In a preferred embodiment, the rubberization of the tire cord fabric serves to promote adhesion and provide some cushion between fiberglass layers.

The hose body includes an inner tube and an outer cover with the reinforcement and insulation layers sandwiched there between. The inner tube and/or outer cover may optionally comprise one or more layers depending on the needs of the application. Tie layers may be used between the layers of reinforcement. The hose body may include an additional cushion rubber layer between the reinforcing layers and the insulating layers of fiberglass cord fabric. The tube, cover, cushion, and tie layers are preferably vulcanized (or crosslinked) rubber compositions. The rubber compounds used are preferably heat and flame resistant. For example, halogenated elastomers (i.e. halogen-containing elastomers) with various fire retardant additives are useful, such as polychloroprene, chlorinated polyethylene (CPE), chlorosulfonated polyethylene (CSM), chlorobutyl elastomer, bromobutyl elastomer, and the like. Non-halogenated elastomers such as nitriles (including carboxylated and/or hydrogenated nitrile copolymers), ethylene vinylacetate, acrylic elastomers, silicones, and the like, with fire retardant additives may also be suitable. Blends of the above may also be suitable. Exemplary rubber compounds may be based on nitrile-containing elastomers such as nitrile-butadiene rubber (NBR) and hydrogenated nitrile-butadiene rubber (HNBR), carboxylated nitriles (XNBR and XHNBR), or based on polychloroprene or chlorinated polyethylene rubber (CR or CPE). The tube, cover, and tie layer compositions may the same or different.

A metal wire may be helically wrapped around the hose to provide collapse resistance. More than one metal wire may be used. The metal wire may be located between the two reinforcing layers of fiberglass cord fabric. Collapse resistance includes resistance to internal vacuum, external crushing forces, and/or kinking forces from bending or twisting.

The inventive hose may be made by any suitable method. For example, the following method may be used to make the hose. The hose may be built up on a mandrel of suitable diameter and length. The inner tube layer may be applied to the mandrel by helically wrapping a strip of unvulcanized rubber onto the mandrel. The rubber strip may be overlapped as it is wrapped in order to provide a desired thickness. The two reinforcing layers may then be helically wrapped onto the mandrel over the rubber inner tube layer. The two layers should be wrapped in opposite directions for a balanced hose construction. A helical wire may be wound onto the mandrel in between the two reinforcing fabric layers, or between two other layers as desired. More than one helical wire may be used. A cushion layer of rubber may be wrapped onto the mandrel over the reinforcing layers. The insulating fabric layers may be wrapped on in basically the same way as the reinforcing layers. Similar care may be taken in prescribing the helical angle to maintain a balanced hose construction, but all the fiber glass cord fabric layers may instead be wrapped on at whatever angle results from the chosen width of material. Finally, the rubber cover layer may be wrapped on in a similar way as the inner tube, as a strip of unvulcanized rubber, with or without overlap.

The fabric layers are preferably wrapped on at a helix angle with respect to the hose axis of from 40° to 60°. The helix angle can depend on the width of the fabric strip being wrapped and the hose circumference. The fabric may be advantageously overlapped as it is wrapped on. Overlap facilitates building at the desired wrap angle with a given width. The overlap is preferably minimal and not intended to result in twice or three times the thickness of fabric. For example, for a nominally three-inch diameter hose, the overlap may advantageously be on the order of about a quarter inch to a half inch. Each layer may be applied a different helix angle, or they may be applied at the same helix angle. In a preferred embodiment, the same fabric strip width is used for all layers with from about a quarter-inch to about a half-inch overlap. As a result, the helix angle of each successively applied fabric ply is a little higher than the previous ply, due to the increasing diameter of the hose build. Thus, it is advantageous to choose the fabric width, overlap, etc. so that the middle ply has a desired average helix angle, such as the lock angle, and the more inner plies and the more outer plies thus compensate for each other's deviations from the desired average. The average helix angle of the fiberglass cord fabric layers may be in the range from about 40 to 60 degrees, preferably from 47 to 60 degrees, or about 54 degrees.

The hose may be corrugated on the outer surface. Corrugation may be accomplished, for example, by helically wrapping a rope tightly around the hose build on the mandrel after applying the nylon cure tape, but before vulcanizing. FIG. 1 illustrates such as helical corrugation 30.

The hose may be vulcanized or cured by any suitable process. One way of curing the hose is to wrap it tightly in strips of fabric, such as nylon fabric. The entire mandrel assembly may then be cured in a steam autoclave, oven or other suitable heat source. The hose may then be unwrapped and the hose removed from the mandrel.

Embodiments of the invention successfully pass fire resistance testing. Two exemplary fire resistance tests are described herein, a simple screening test and an international standard test.

Figure 2:
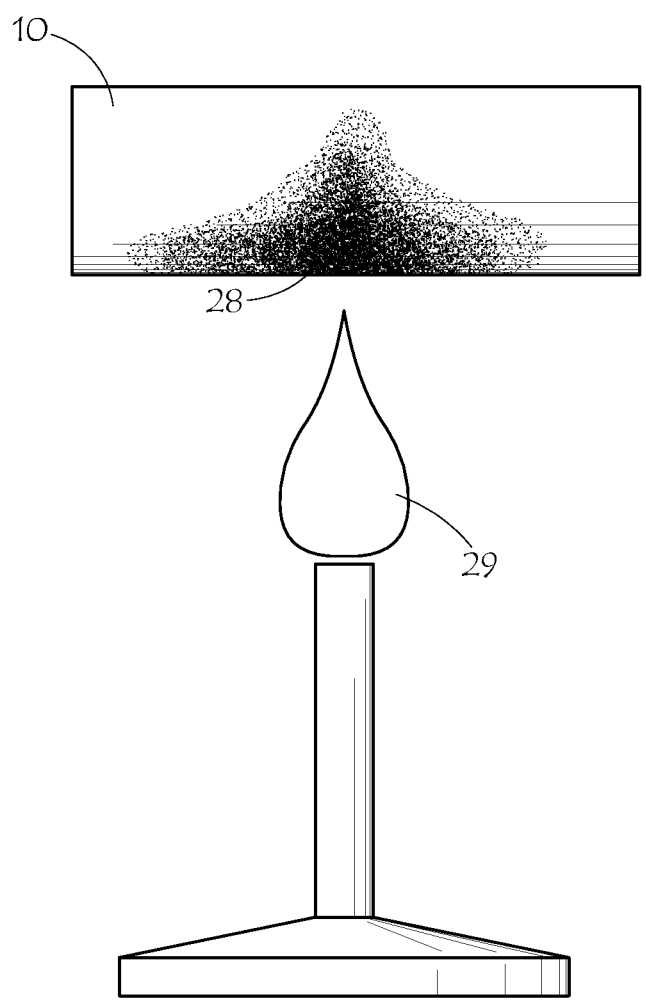
FIG. 2 is a schematic representation of a test method for flame resistance.

The fire resistance screening test utilized herein is illustrated in FIG. 2. In FIG. 2, hose portion 10 which is open at both ends is suspended directly above flame 29. Flame 29 preferably has a temperature on the order of 800° C. The flame may be applied for 30 to 35 minutes. A test hose will typically either catch on fire and fail quickly, or char over a large area as indicated by charred region 28 in FIG. 2. The temperature of the air inside the hose and/or the temperature at various desired positions within the hose may be monitored if desired. A successful hose will not burn clear through in 30 minutes and/or maintain a significant temperature difference between the inside of the hose and the outside flame temperature. The temperature inside the hose is reported in the testing below. The condition of the inner tube layer at the end of the test is reported.

The international standard test utilized herein is BS ISO 15540:1999 incorporating amendment number 1, "Ships and Marine Technology—Fire resistance of hose assemblies—test methods," hereinafter "ISO 15540." ISO 15540 calls for a hose assembly with hose length of at least 500 mm. The hose ends include fittings for circulating pressurized water at 5±2 bar and at a flow rate chosen to maintain the inlet water temperature at 80±2° C. and the outlet water temperature at a maximum of 85° C. The burner ends extend beyond the hose fittings at least 20 mm, and the burner width is chosen to ensure the flames reliably enclose the whole test hose. The flame temperature is maintained at 850±50° C. and measured outside the hose at one end of the hose and at the middle. The test duration is 30 minutes. The test is successfully passed if there are no water leaks form the hose when subjected to a higher proof pressure at ambient temperature for two minutes after flame application. Herein, a proof pressure of about twice the desired working pressure of the hose was chosen. Preferably the proof pressure is at least 10 bar.

Example 1 ("Ex. 1") was constructed according to an embodiment of the invention. Ex. 1 was built up on a rigid mandrel of diameter three inches. Two plies of NBR rubber calendered 0.040-inches (1-mm) thick were applied to the mandrel to form the inner tube. A first reinforcing ply of fiberglass tire cord fabric seven-inches wide was then applied by wrapping with a 0.25-inch (6.35-mm) overlap. The tire cord fabric used for this and all subsequent plies was type EC10T330 2X0 warp with 20's HWM rayon filling with 20.5±2% RFL dip pickup and an NBR rubber skim coating, with a final thickness of 0.030 inches (0.76 mm). The skim coating serves to rubberize the cord fabric, providing for encapsulation of the cord and a thin tie layer of rubber between cord layers. After the first reinforcing ply, a tie layer of calendered NBR rubber 0.036-inches (0.91-mm) thick was applied. Then two helical wires were applied. Each wire was of 0.080-inch (2-mm) diameter and wrapped with a 1.5-inch (38-mm) helical pitch, thus spaced apart from each other by about 0.75 inches (19.1 mm). Then a second ply of fiberglass tire cord fabric seven-inches wide was applied by wrapping with a 0.25-inch (6.35-mm) overlap, starting the wrap from the opposite end of the mandrel from the first reinforcing ply. Then four insulating plies of fiberglass tire cord fabric seven-inches wide were applied by wrapping with a 0.25-inch (6.35-mm) overlap, alternating helical wrap directions and starting ends of mandrel. Finally, two plies of CR rubber calendered 0.036-inch (0.91-mm) thick were applied to form the outer cover. The completed hose build was wrapped with nylon cure tape and cured 45 minutes at 338° F. (170° C.), and the tape removed. The resulting hose was designed to have a working pressure of at least 10 bar (150 psi) (1.03 MPa), and therefore it needed to pass the ISO 15540 fire testing with a proof pressure of 21 bar (300 psi) (2.07 MPa) and have a minimum burst pressure of 41 bar (600 psi) (4.14 MPa). In fact, the hose of Ex. 1 passed the ISO 15540 fire testing and exhibited a burst pressure of 200 bar (2900 psi) (20 MPa), almost five times higher than expected.

Ex. 2 was constructed in a way similar to Ex. 1 except that only three insulating layers of fiberglass tire cord fabric were applied.

Ex. 3 was constructed in a way similar to Ex. 1 except that only two insulating layers of fiberglass tire cord fabric were applied.

Ex. 4 was constructed in a way similar to Ex. 3 except that the two insulating layers were two layers of a woven ceramic fiber fabric and the reinforcing layer was wire braid. The ceramic fabric was not RFL-treated, but was skim coated. Adhesion was not adequate for commercial use, although fire resistance was very good. It is expected that with adequate rubberization and/or adhesive treatment the ceramic fabric would make a very good insulating layer for a fire resistant hose, even with polyester (or other non-fire resistant) reinforcing layers.

Comparative Example 5 ("Comp. Ex. 5") was constructed in a way similar to Ex. 1 except that the insulating layers were woven fiberglass mat fabric and the two reinforcing layers were standard polyester reinforcing fabric layers.

Each of the examples and comparative examples described above was subjected to the fire resistance screening test described above. The results are shown in Table 1 below. The comparative examples allowed the flame to burn through the hose to the inside, failing the screening test. The inventive examples that were tested showed some degree of degradation of from the flame, but exhibited a limited rise in the internal temperature. The best results were for Ex. 1 and Ex. 4. Ex. 1, as discussed above was selected to undergo the ISO 15540 fire testing. Ex. 4 was not tested further because of the difficulties observed in handling the ceramic fibers (mainly lack of adhesion) and the high cost of thereof.

TABLE 1

| Fire resistance screening test results | Ex. 1 | Ex. 2 | Ex. 3 | Ex. 4 | Comp. Ex. 5 |
|---|---|---|---|---|---|
| Peak internal temperature (° C.) | 177 | 260 | n.t.[1] | 100 | n.t. |
| Tube degradation | minor | major | n.t. | none | major |
| Test Duration (min.) | 30 | 30 | n.t. | 30 | 20 |

[1]not tested

Thus, the present invention provides flame and heat resistance for industrial hoses by incorporating fiberglass tire cord fabric as the reinforcement and the insulation. Typically in hose with multiple layers of reinforcement, the burst strength is dominated by the first two layers and subsequent layers have a rapidly diminishing effect. In embodiments of the invention, it was discovered that the additional insulating layers of fiberglass tire cord fabric reinforcement provided significantly increased burst strength. So the present invention provides for both greatly improved fire resistance and improved burst strength.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A flame resistant hose comprising:
   a rubber inner tube layer;
   two reinforcing plies of fiberglass unidirectional cord fabric helically wrapped at a helix angle in the range of 40-60 degrees with respect to the hose longitudinal axis and with the edges of each reinforcing ply overlapping up to about 0.5 inches;
   one or more insulating plies of fiberglass unidirectional cord fabric helically wrapped at a helix angle in the range of 40-60 degrees with respect to the hose longitudinal axis and with the edges of each ply overlapping up to about 0.5 inches; and
   a rubber outer cover layer.

2. The hose of claim 1 further comprising a rubber tie layer between each of said reinforcing plies and each of said insulating plies.

3. The hose of claim 1 wherein the outer cover layer comprises a nitrile-containing rubber composition or a halogenated rubber composition.

4. The hose of claim 1 wherein the inner tube layer comprises a nitrile-containing rubber composition.

5. The hose of claim 1 wherein a test specimen of said hose exhibits no water leaks when filled with 78-85° C. water pressurized at 5±0.2 bar and subjected to at least 30 minutes of exposure to fire with flames enclosing the test specimen at a flame temperature of 800±50° C.

6. The hose of claim 5 which further exhibits no leaks when pressurized to a proof pressure of at least 10 bar for two minutes at ambient temperature subsequent to said 30 minutes of exposure to fire.

7. The hose of claim 1 further comprising no additional textile reinforcing layers of organic polymeric fibers.

8. The hose of claim 1 further comprising no silicone rubber layer.

9. The hose of claim 1 further comprising no thermoplastic polymer layer, no fluoropolymer layer, and no braided or spiraled metal fiber layer.

10. The hose of claim 1 further comprising a helical wire.

11. The hose of claim 10 wherein the helical wire is embedded in the hose between the two reinforcing plies.

12. The hose of claim 1 further comprising a corrugated outer surface.

13. The hose of claim 1 wherein at least one ply of fiberglass unidirectional cord fabric is penetrated and coated with an adhesive composition.

14. The hose of claim 1 wherein each ply of fiberglass unidirectional cord fabric is rubberized.

15. The hose of claim 1 wherein the number of said insulating plies is from two to eight.

16. A flame resistant hose consisting of:
    a nitrile-containing rubber inner tube layer;
    two reinforcing plies of rubberized fiberglass unidirectional cord fabric helically wrapped at a helix angle in the range of 40-60 degrees with respect to the hose longitudinal axis and with the edges of each reinforcing ply overlapping up to about 0.5 inches;
    from two to eight insulating plies of rubberized fiberglass unidirectional cord fabric helically wrapped at a helix angle in the range of 40-60 degrees with respect to the hose longitudinal axis and with the edges of each ply overlapping up to about 0.5 inches; and
    a halogen-containing rubber or nitrile-containing rubber outer cover layer.

17. The hose of claim 16 further having one or two helical wires embedded in the hose.

18. The hose of claim 17 wherein the one or two helical wires are embedded in the hose between the two reinforcing plies.

19. The hose of claim 18 wherein said two reinforcing plies are located between said inner tube layer and said insulating plies.

20. The hose of claim 19 which successfully passes fire resistance testing when tested according to the specification identified as "BS ISO 15540:1999 Incorporating Amendment No. 1".

* * * * *